Jan. 19, 1960   H. W. TREVASKIS   2,921,811
RESILIENT WHEEL FOR RAILWAY VEHICLES
Filed Sept. 17, 1958   2 Sheets-Sheet 1

INVENTOR
Henry William Trevaskis
by Benj. T. Rauber
his attorney

Jan. 19, 1960 H. W. TREVASKIS 2,921,811
RESILIENT WHEEL FOR RAILWAY VEHICLES
Filed Sept. 17, 1958 2 Sheets-Sheet 2

INVENTOR
Henry William Trevaskis
by Benj. J. Rauber
his attorney

United States Patent Office 2,921,811
Patented Jan. 19, 1960

2,921,811

RESILIENT WHEEL FOR RAILWAY VEHICLES

Henry William Trevaskis, Point Pleasant, Blackdown, near Leamington Spa, England, assignor to Dunlop Rubber Company Limited, London, England, a British company Application September 17, 1958, Serial No. 761,590

Claims priority, application Great Britain September 24, 1957

8 Claims. (Cl. 295—12)

This invention relates to resilient wheels for railway vehicles and more particularly relates to resilient wheels of the kind in which a pneumatic cushion is interposed between the rim and the web of the wheel.

The object of the present invention is to provide an improved resilient wheel of this kind.

According to the invention a resilient wheel comprises an annular rim the inner surface thereof being convex in cross-section and a load supporting web located within the rim and provided at its outer periphery with an annular trough open at its outer periphery and fluid-tightly sealed by a resilient member to form an inflatable chamber, the convex inner surface of said rim being resiliently supported on said resilient member and the effective area of contact between said surface and said resilient member increasing with increase of load on said wheel.

When such a wheel is fitted to a railway or other vehicle and is under load the web is eccentrically located relative to the rim, its centre being displaced vertically downwards relative to the centre of the rim so that maximum deflection of the resilient member is effected adjacent the bottom or vertically lowest part of the wheel whilst the minimum deflection of the resilient member is effected adjacent the top of the wheel. Thus by the term "effective area of contact" is meant the area of the resilient member adjacent the bottom of the wheel which does the work of resiliently supporting the wheel. Due to the convex shape of the inner surface of the rim this area progressively increases with an increase in the load carried by the wheel.

Figure 1:
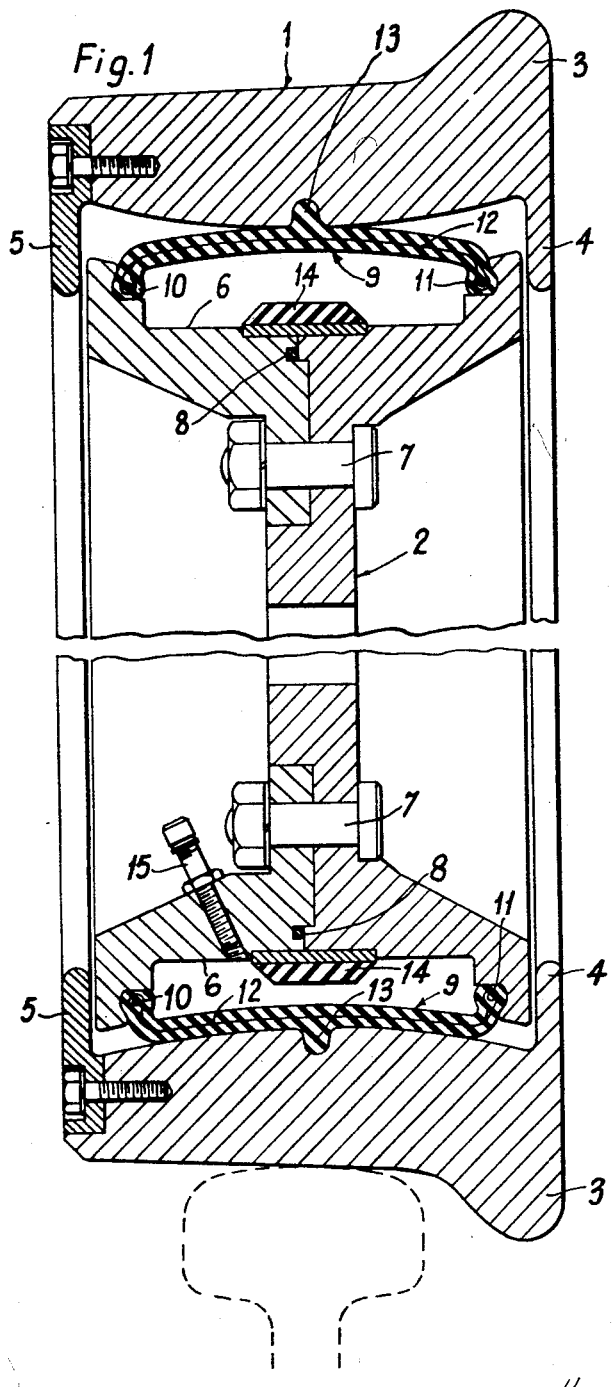
Figure 2:
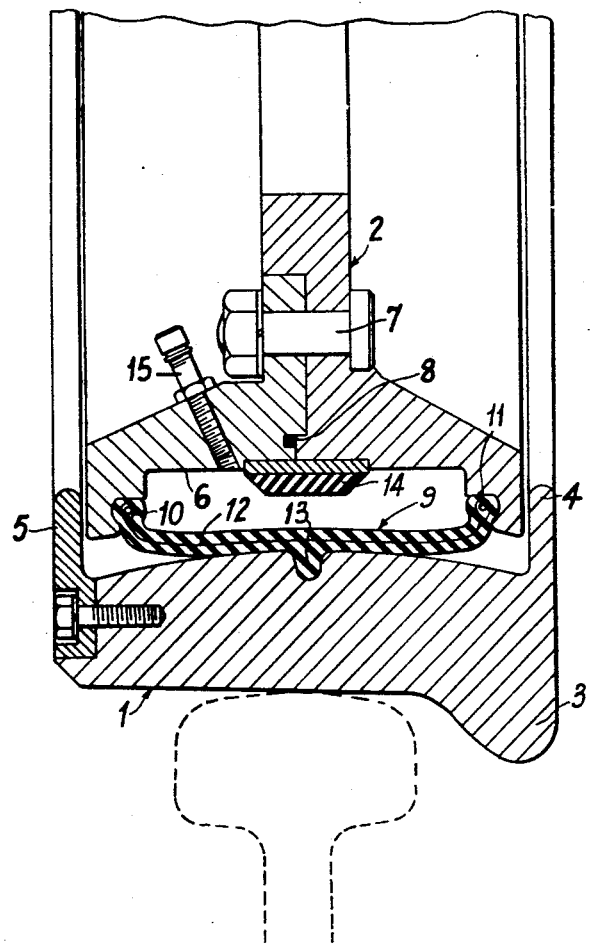

The invention is illustrated in the accompanying drawings of which:

Figure 1 is a vertical section through one embodiment of a fully-loaded railway wheel constructed in accordance with the invention and showing the resilient member in approximately its fully deflected position, and Figure 2 is a section of the lower part of the same wheel partly loaded and showing partial deflection of the resilient member.

The wheel, designed for a light rail car, comprises an annular rail-contacting rim 1 encircling a load-supporting web 2 which is secured at its centre to a shaft in known manner. The outer surface of the rim is provided adjacent one edge with a radially-outwardly extending flange 3 in the usual way and the inner surface of the rim is convex in cross-section, projecting radially-inwardly of the rim in a smooth curve of constant radius. On each side of said convex inner surface is a radially-inwardly-extending annular flange, one flange 4 being formed integral with the rim and the other flange 5 being detachably secured thereto.

The web 2 is provided at its outer periphery with an open annular trough 6, the open side of the trough facing radially outwardly and lying adjacent the inner convex surface of the rim. The trough is located between the flange 4 and 5 of the rim, lateral movement of the trough relative to the rim thereby being restricted. The trough is formed in two parts, being split substantially medially, and the parts are detachably joined together by angularly-equispaced nut and bolt assemblies 7. An annular resilient seal 8 is located fluid-tightly in a recess between said trough-parts adjacent the base of said trough.

The inner walls of the trough are outwardly stepped about half-way up from the base to provide seatings for the beaded edges of a resilient annular diaphragm 9. The diaphragm is moulded to a substantially flat shape with substantially radially-inwardly directed beads 10 each of which is provided with a circled wire reinforcement 11. The diaphragm, which is preferably made of rubber or a rubber-like material, is also reinforced with wire or fabric cords 12 associated at their ends with the circled wire reinforcements. The outer periphery of the diaphragm is provided mid-way between its ends with an annular rib 13 which is located within a corresponding groove in the convex inner surface of the rim. An annular rubber buffer 14, for a purpose later to be described, is bonded to a metal band which is located in a suitable recess centrally in the base of the trough.

The base of the trough is provided with an air charging connection, with a non-return valve 15, to enable the chamber formed between the diaphragm and the trough to be charged with air at a predetermined pressure, e.g. 200 p.s.i.

With the wheels supporting the weight of an unladen truck only, the part of the diaphragm at the bottom of the wheel will be deformed substantially as indicated in Figure 2 the part of the diaphragm at the top of the wheel being substantially undeflected and making point contact only, along the rib 13, with the wheel rim. As the load on the truck increases so does the area of diaphragm at the bottom of the wheel contacting the rim progressively increase to carry the load until, with the truck fully loaded, the diaphragm is deflected substantially as shown at the bottom of Figure 1, so that substantially all its effective area is being utilized to carry the load.

Relative axial movement between the rim and the web of the wheel is prevented by the rib 13 engaging in its complementary groove and is in any case restricted by the annular flanges 4 and 5. Should a leakage occur and the chamber deflate the diaphragm will contact the rubber buffer 14 without seriously effecting the efficiency of the wheel.

Having now described my invention, what I claim is:

1. A resilient wheel comprising an annular rim having an inner peripheral load supporting surface, a load supporting web located within said rim and having an outer periphery spaced from the load supporting surface of said rim, and an annular pneumatic element mounted on the periphery of said web and having an outer peripheral load supporting surface in contact with the supporting surface of said rim, a transverse section of at least one of said load supporting surfaces being slightly convex toward the other load supporting surface so that said supporting surfaces are in contact at a medial zone and whereby a slight decrease in the radial distance of said rim from the periphery of said web at any place magnifies the extent of said zone at said place.

2. The resilient wheel of claim 1 in which the inner load supporting surface of said rim is convex in cross-section toward the axis of said wheel.

3. The resilient wheel of claim 1 having annular flanges extending inwardly from said rim to overlap the outer edge of said web thereby to limit the relative axle movement of said rim and said web.

4. A resilient wheel comprising an annular rim the inner surface thereof being convex in cross-section, a load supporting web located within the rim and provided at its outer periphery with an annular trough, a continuous, substantially flat resilient diaphragm secured to the edges of the trough to form an inflatable chamber, the said diaphragm resiliently supporting the convex surface of the annular rim whereby the effective area of contact between said surface and said diaphragm increases with an increase of load on said wheel.

5. The resilient wheel of claim 4, having an annular resilient buffer in the base of the annular trough of said web to transmit the wheel load from said web to the rim upon failure of said chamber.

6. A resilient wheel according to claim 4 wherein the resilient member comprises an annular, substantially flat diaphragm having radially-inwardly turned edges fluid-tightly associated with said annular trough.

7. A resilient wheel according to claim 6 wherein the said edges are provided with inextensible reinforcements.

8. A resilient wheel according to claim 7 wherein the diaphragm is provided centrally with an annular locating rib positioned in a recess in the convex inner surface of the annular rim.

References Cited in the file of this patent

UNITED STATES PATENTS

| | | |
|---|---|---|
| 1,963,932 | Bollinger | June 19, 1934 |
| 1,977,387 | Howald | Oct. 16, 1934 |
| 2,155,564 | Schippel | Apr. 25, 1939 |
| 2,667,767 | Burrell | Feb. 2, 1954 |